(12) United States Patent
Hashimoto

(10) Patent No.: US 6,633,915 B1
(45) Date of Patent: Oct. 14, 2003

(54) PERSONAL INFORMATION MANAGEMENT APPARATUS AND CUSTOMIZING APPARATUS

(75) Inventor: Sunao Hashimoto, Nakai-machi (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 09/510,525

(22) Filed: Feb. 22, 2000

(30) Foreign Application Priority Data

Feb. 22, 1999 (JP) ............................................ 11-042605

(51) Int. Cl.[7] ............................................. G06F 15/16

(52) U.S. Cl. ........................ 709/228; 709/227; 709/218

(58) Field of Search ................................ 709/224, 227, 709/228, 229, 203, 218; 713/200; 707/10, 501.1

(56) References Cited

U.S. PATENT DOCUMENTS

| 5,946,687 | A | * | 8/1999 | Gehani et al. ................. 707/10 |
| 5,971,277 | A | * | 10/1999 | Cragun et al. ........... 235/462.01 |
| 5,983,227 | A | * | 11/1999 | Nazem et al. ................. 707/10 |
| 6,199,079 | B1 | * | 3/2001 | Gupta et al. ................. 707/507 |
| 6,308,203 | B1 | * | 10/2001 | Itabashi et al. ............. 709/217 |
| 6,330,610 | B1 | * | 12/2001 | Docter et al. ................ 709/229 |
| 6,421,693 | B1 | * | 7/2002 | Nishiyama et al. ......... 707/507 |
| 6,421,729 | B1 | * | 7/2002 | Paltenghe et al. .......... 709/229 |
| 6,460,042 | B1 | * | 10/2002 | Hitchcock et al. ............ 707/10 |

FOREIGN PATENT DOCUMENTS

| JP | A-10-260821 | 9/1998 | |
| WO | WO 9717662 A1 | * 5/1997 | ........... G06F/17/30 |

OTHER PUBLICATIONS

Hensley, P. et al., "Proposal for an Open Profiling Standard", www.w3.org/TR/NOTE–OPS–FrameWork.html, submitted to W3C, Jun. 1997.*

Hensley, P. et al., "Implementation of OPS Over HTTP", www.w3.org/TR/NOTE–OPS–OverHTTP.html, submitted to W3C, Jun. 1997.*

Hensley, P. et al., "Standard Practices for OPS Systems", www.w3.org/TR/NOTE–OPS–StandardPractices,html, submited to W3C, Jun. 1997.*

Krulwich, B., "Automating the Internet: agents as user surrogates", IEEE Internet Computing, ISSN: 1089–7801, vol. 1, iss. 4, pp. 34–38, Aug. 1997.*

(List continued on next page.)

*Primary Examiner*—Mark R. Powell
*Assistant Examiner*—Jason D. Cardone
(74) *Attorney, Agent, or Firm*—Oliff & Berridge, PLC

(57) ABSTRACT

The present invention suitably manages personal information of client users in a distributed environment in which clients to request resource service and servers to provide the resource service are connected via a network, and provides resources customized based on user's personal information. The personal information management apparatus has a personal information storage unit that stores personal information, and a personal information management unit that performs registration, modification, and deletion of personal information entries for the personal information storage unit. On receiving a personal information fetching request containing character strings of a predetermined format, the personal information management apparatus fetches a relevant personal information entry from the personal information storage unit, analyzes a received character string to replace a partial character string with the relevant personal information, and thus replies to the request. Resource providers not managing personal information can also provide resources customized by use of personal information.

10 Claims, 13 Drawing Sheets

OTHER PUBLICATIONS

Hoashi, K. et al., "Data collection for evaluating automatic filtering of hazardous WWW information", IEEE Internet Workshop, ISBN: 0-7803-5925-09, pp. 157-164, Feb. 1999.*

Maglio, P. et al., "Intermediaries personalize information streams", Communications of the ACM, vol. 43, iss. 8, pp. 96-101, Aug. 2000.*

Fielding, R. et al., "Hypertext Transfer Protocol—HTTP/1.1", Request For Comment 2068, pp. 1-162, Jan. 1997.*

Corporate Profile, Duo Systems Co., Ltd., 2002.

R. Fielding, "Relative Uniform Resource Locators", UC Irivine RFC 1808, Jun. 1995.

T. Berners-Lee et al., "Uniform Resource Locators (URL)", RFC 1738, Dec. 1994.

T. Berners-Lee et al., "Hypertext Markup Language—2.0", RFC 1866, Nov. 1995.

T. Berners-Lee et al., "Hypertext Transfer Protocol—HTTP/1.0", RFC 1945, May 1996.

* cited by examiner

FIG.4

| USER NAME | PASSWORD | NAME | ADDRESS |
|---|---|---|---|

FIG.5

REGISTRATION OF PERSONAL INFORMATION

USER NAME: ☐

PASSWORD: ☐

NAME: ☐

ADDRESS: ☐

[ REGISTER ]  [ CANCEL ]

FIG.6

REGISTRATION OF PERSONAL INFORMATION

USER NAME: hashimoto

PASSWORD: hogehoge

NAME: HASHIMOTO

ADDRESS: HADANO

REGISTER   CANCEL

FIG.7

| USER NAME | PASSWORD | NAME | ADDRESS |
|---|---|---|---|
| hashimoto | hogehoge | HASHIMOTO | HADANO |

FIG.9

ABCD CO., LTD.

LINK TO COMPANY GUIDANCE

```
<html>
<head>
<title>ABCD CO., LTD.</titke>
</head>
<body>
<HI>ABCD CO., LTD.
<center>
<A HREF="http://PPS1A/PPSP?CURL=http://W1A/CPAGE?name=$NAME&adress1=$ADDRESS&address2=AKASAKA">LINK TO COMPANY GUIDANCE
</A>
</center>

........    ........    ........

</body>
</html>
```

FIG12

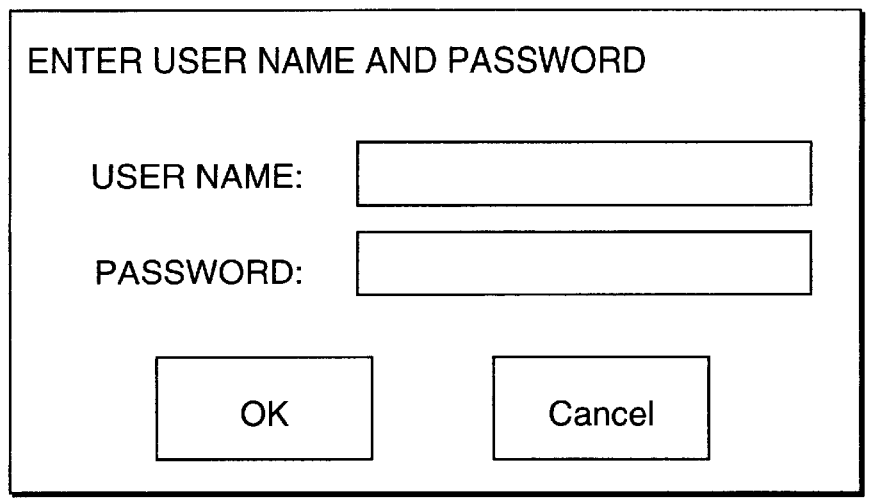

ENTER USER NAME AND PASSWORD

USER NAME:

PASSWORD:

OK   Cancel

FIG13

```
<HTML><HEAD><script language="JavaScript">
confirm(TRANSFER FOLLOWING PERSONAL INFORMATION TO
SERVER W1A¥nNAME:HASHIMOTO¥nADDRESS:HADANO");</script>
<METAHTTP-EQUIV="Refresh"
"CONTENT="1;URL="http://W1A/CPAGE?name=HASHIMOTO&
address1=HADANO&address2=AKASAKA"></HEAD><BODT>
</BODY></HTML>
```

FIG.15

TRANSFER FOLLOWING PERSONAL
INFORMATION TO SERVER W1A.

NAME         :HASHIMOTO

ADDRESS      :HADANO

| OK | Cancel |

FIG.17
ABCD CO., LTD. COMPANY GUIDANCE
LOCATION: AKASAKA
(1) MAP TO HASHIMOTO
(2) TRAIN TRANSFER GUIDANCE TO HASHIMOTO

PERSONAL INFORMATION MANAGEMENT APPARATUS AND CUSTOMIZING APPARATUS

BACKGROUND OF THE INVENTION

1. Field of the Invention

The present invention relates to a personal information management apparatus and a customizing apparatus that manage users' personal information and customize resources according to the personal information, and more particularly to a personal information management apparatus and a customizing apparatus that manage personal information of each client user in a distributed network system having one or more severs and one or more clients and customize resources according to the personal information.

To be more specific, the present invention relates to a personal information management apparatus and a customizing apparatus that enable the servers to transfer resources customized according to users' personal information in response to a resource service request from a client user. The present invention relates to, for example, a personal information management apparatus and a customizing apparatus for a browser of WWW clients to display pages customized according to user's personal information in WWW resource spaces having WWW (World Wide Web) servers and WWW clients.

2. Description of the Prior Art

In recent years, there has been a remarkable development in the field of information processing and information communications. In the technical field of this type, a study and development for interconnecting computer systems has been heretofore made actively. A major object of interconnecting systems is to share and distribute computer resources and information among plural users.

Transmission media or networks for interconnecting systems include LAN (Local Area Network) built within a limited space such as the premises of a college or office; WAN (Wide Area Network) for connecting LANs over a leased line; public switched telephone network (PSTN); ISDN (Integrated Service Digital Network); and Internet having communications networks expanded on a global scale.

A network system is generally built as a client-server model in which specific computers on a network are designated servers (file server, print server, etc.) and other clients share servers' resources. In such a client-server model, execution of a part of a procedure to constitute clients' programs is committed to another computer on the network in the format of remote procedure call (RPC) or remote method invocation (RMI). The result of executing the remote procedure is returned to the calling computer as a return value. Input can be made to the program by using a keyboard and files of a computer in hand, and output can be made to a display and files of the same computer.

The mechanism of the remote procedure call or remote method invocation, without being limited to the LAN world, is also usable in global networks such as Internet.

For example, a global information retrieval system, called WWW (World Wide Web), for providing resource spaces of hyperlink structure, is publicized and counted as one of the reasons for explosive widespread use of Internet. Message exchange for resource access and the like is performed between WWW servers and WWW clients on the WWW resource spaces in the format of remote procedure call or remote method invocation according to various protocols such as HTTP (Hyper Text Transfer Protocol) and the following protocols: HTTPS, S-HTTP (Secure HTTP), FTP (File Transfer Protocol), CORBA (Common ORB Architecture), IIOP (Internet Inter-ORB Protocol), JavaRMI (Remote Method Invocation). CGI (Common Gateway Interface) is known as a method for executing procedures on WWW servers. The HTTP protocol is described in, e.g., RFC (Request For Comments) 1945 and RFC2068.

A WWW server provides resource objects possessed by it to WWW clients wherein the resource objects are located by an identifier called URL (Uniform Resource Locator). URL refers to a character string specifying a resource name and is described in the format of "scheme name (protocol name)://host name (domain name): port number/path name (file name)". URL is described in, e.g., RFC1738 and RFC1808.

The type of resources especially frequently used on WWW is documents written in the HTML (Hyper Text Markup Language) language, that is, hypertext. HTML is described in, e.g., RFC1866 (already known).

On the other hand, WWW clients are computer systems that operate using an application called a WWW browser for browsing WWW resources, that is, documents written primarily in the HTML format.

The WWW browser, an application for reproducing homepage on screens, according to URL (or URL embedded in an anchor on a homepage) entered in a location box on a WWW browser window screen, searches WWW resource spaces of hyperlink structure on networks, finds out a resource object or a HTML file from a relevant HTTP service, and downloads data from a WWW server. The WWW browser analyzes the downloaded HTML file and displays it on a browser window screen as a homepage.

Normal WWW browsers, according to a HTML file obtained from a WWW server, faithfully reproduce a homepage on a browser window screen and present it to a client user. However, some users may desire to customize the homepage according to the users' own personal information.

There is disclosed in Japanese Published Unexamined Patent Application No. Hei 10-260821 an automatic creation system that customizes the start page of a WWW browser according to users' personal information. In this automatic creation system, by in advance registering users, personal information in the servers to provide pages, the servers can automatically create pages customized according to the user's personal information and provide the pages to the users.

However, the servers may commit a part of service requested from a client to other servers. One of the methods by which servers request service supply from other servers is CGI (Common Gateway Interface). According to the method described in the Japanese Published Unexamined Patent Application No. Hei 10-260821, in the case where resources possessed by plural servers must be used to create a certain page, all servers concerned in supplying the page must possess a user's personal information. Such distribution of the user's personal information to plural servers is problematic in terms of security.

Recently, there are increasing cases in which the presentation of users' personal information and replies to questionnaires are requested on homepages. For example, many prize pages are provided with a blank form for inputting applicants, personal information as a precondition for accepting application.

"ANAUMEKUN™ (blank-filler)" offered by Duo System, Ltd. is a service system that substitutes for users to input users' personal information (See the URL www2.duo.co.jp). This service requests a user to in advance register users' personal information in the server of "ANAUMEKUN (blank-filler)". The server of "ANAUMEKUN (blank-filler)" provides a list of prize pages and presents them to the user. The user selects a favorite prize page from the list provided by "ANAUMEKUN (blank-filler)". "ANAUMEKUN (blank-filler)", in response to the selection operation, requests a server possessing the relevant page to provide resources. When transferring the obtained page to the user, "ANAUMEKUN (blank-filler)" inserts the registered personal information in a mandatory personal information entry field on the page. Therefore, as for the personal information registered in the sever of "ANAUMEKUN (blank-filler)", the user can be saved the trouble of filling in a blank form provided in the prize pages.

However, "ANAUMEKUN (blank-filler) " is concerned in only filling in a blank form provided in prize pages or the like and is beyond the scope of application of users' personal information to other uses and purposes. In other words, "ANAUMEKUN (blank-filler)" excludes customizing pages based on users' personal information from the scope of processing. Also, "ANAUMEKUN (blank-filler)" is concerned in only inputting personal information to a blank form and the prize pages themselves are provided from other external servers. Regardless of the purpose of customizing the pages in the interest of users, other servers cannot use personal information stored in "ANAUMEKUN (blank-filler)".

A method well-known to those skilled in the art is that users' personal information is held by a WWW browser and sent to a WWW server to customize pages. This method has the following mechanism. Information held by the WWW browser is called "Cookie". The WWW server to provide customized service generates character string information for identifying a user, that is, Cookie, and transfers it to the browser. The WWW server and the browser save Cookie in files on the respective computer systems. When the user accesses the customized service again, the browser transfers Cookie on the user's computer to the WWW server to have it recognize the user.

However, such a Cookie-based method has a drawback that, when one user uses plural browsers (for example, when plural PCs are used for different purposes), unless identical personal information is written to each of the browsers, identical pages on a WWW server will not be customized in the same way. Namely, Cookie having identical contents, that is, personal information, must be stored in all the browsers used by the user. Also, when changing the personal information, modifications must be made for all the browsers.

The Cookie-based method requires that Cookie character string information be exchanged each time between a browser and a WWW server, with the result that an increase in the types and amount of personal information would increase the load on data transfer.

SUMMARY OF THE INVENTION

The present invention provides an excellent personal information management apparatus and customizing apparatus that can suitably manage users' personal information and customize processing according to the personal information.

The present invention also provides an excellent personal information management apparatus and customizing apparatus that, in a distributed network system having one or more servers and one or more clients, can suitably manage personal information of each client user and customize resource supply services according to the personal information.

The present invention further provides an excellent personal information management apparatus and customizing apparatus that enable servers to a customize and transfer resources according to users' personal information in response to a resource service request from a client user.

The present invention further provides an excellent personal information management apparatus and a customizing apparatus that enable a browser of WWW clients to display pages customized according to users' personal information in a WWW resource space having WWW (World Wide Web) servers and WWW clients.

The present invention is applied to manage client users' personal information in a network of open environment such as Internet. The network connects myriad clients and servers by TCP/IP (Transmission Control Protocol/Internet Protocol) and can transfer messages according to, e.g., the HTTP (Hyper Text Transfer Protocol) protocol.

According to the present invention, personal information of individual users is stored in a personal information management apparatus connected to a network. Specifically, since users' personal information is managed only in the personal information management apparatus, users are saved the trouble of registering and modifying the personal information as often as the number of browsers they use.

Servers to provide resources are dispersed on a network. An example of resources is hypertext written in the HTML (Hyper Text Markup Language) format, which contains references of a URL (Uniform Resource Locator) character string format describing link relations to other resources.

A reference to a resource customized according to user's personal information, that is, a URL character string (referred to as "URL1") is described in the format that includes the address of a server to provide the resource, a procedure for executing customizing, and variables to be converted to personal information required for the customizing.

A server to provide the resource customized according to users' personal information provides a URL (referred to as "URL2") on the resource or a page wherein the URL is described in the format that includes the address of a personal information management apparatus, and a procedure for converting the variables in the character string URL1 to personal information.

When a user performs an operation to open the URL2, a request to retrieve personal information is issued to the personal information management apparatus and relevant personal information is obtained. After the variables in the URL1 character string are replaced by personal information, an operation to open the URL1, that is, a procedure for supplying a customized resource is executed. As a result, the customized resource is provided to the user.

The server itself to provide the resource customized according to users' personal information need not handle the personal information and is therefore free from security problems.

Specifically, according to the present invention, users can newly register or modify personal information without the trouble of having each of plural servers register or modify the personal information. Resource providers not managing personal information can also provide resources customized by use of personal information.

BRIEF DESCRIPTION OF THE DRAWINGS

A preferred embodiment of the present invention will be described in detail based on the followings, wherein:

FIG. 4 is a schematic view of the format of a personal information entry stored in a personal information storage unit 31;

FIG. 5 is a schematic view of a registration page (blank) for inputting personal information, displayed on the WWW browser screen;

FIG. 6 is a schematic view of the registration page (filled) for inputting personal information, displayed on the WWW browser screen;

FIG. 7 illustrates an example of a personal information entry transferred to the personal information management unit 10C;

FIG. 9 illustrates an example of the homepage of ABCD Co., Ltd., produced by reproducing page data PG2;

FIG. 10 illustrates a source code of the page PG2;

FIG. 12 illustrates a dialog box displayed on the WWW browser screen for user authentication;

FIG. 13 illustrates a source code of a page PG3 created by a procedure PPSP;

FIG. 15 illustrates a dialog box for requiring a user to confirm personal information to be transferred to a server;

FIG. 17 illustrates a company guidance page customized according to a user's personal information.

DESCRIPTION OF THE PREFERRED EMBODIMENT

Figure 1:
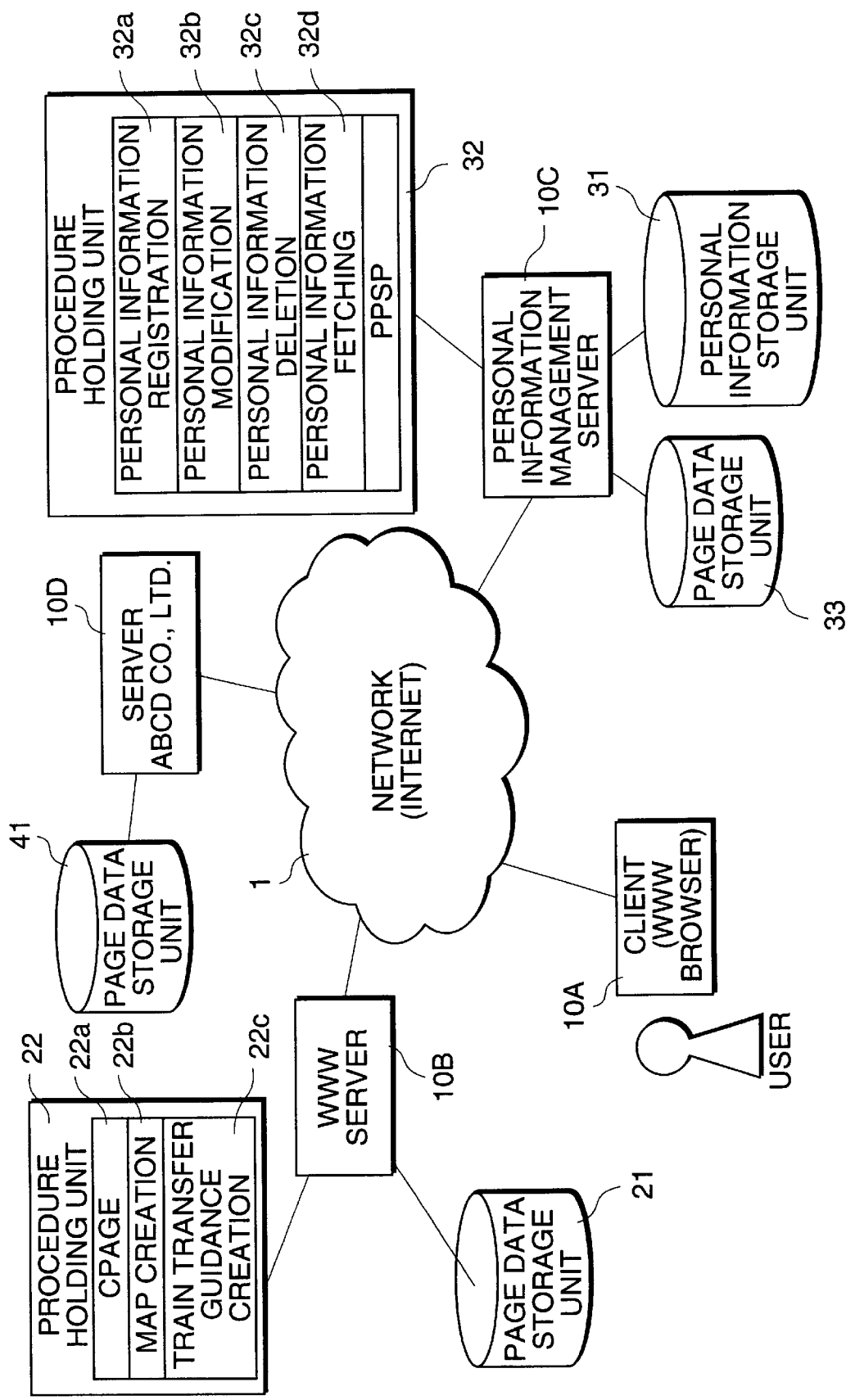
FIG. 1 is a schematic view of a configuration of a network system 100 suitable to implement the present invention.

FIG. 1 is a schematic view of a configuration of a network system 100 embodied by the present invention. The network system 100 has a myriad of computer systems 10A, 10B, and so forth connected to a network 1 used as a transmission medium to provide a distributed computing environment. Hereinafter, components of the network system 100 will be described.

The network 1 is, e.g., Internet, which is a large-scale cluster of networks. The computer systems 10A, 10B, and so forth are connected by, e.g., TCP/IP (Transmission Control Protocol/Internet Protocol) through the network 1.

An example shown in FIG. 1 assumes that WWW (World Wide Web) resource space is built on the network 1. The word WWW refers to a global information retrieval system that provides resource space of hyperlink structure, and a system of client-server model constituted by WWW servers and WWW clients.

Between WWW servers and WWW clients, access to WWW resources is performed according to the HTTP (Hyper Text Transfer Protocol) protocol. The type of resource used especially often on WWW is documents written in the HTML (Hyper Text Markup Language) language, or hypertext. Resources on the servers are specified by URL (Uniform Resource Locator) (as previously described).

In FIG. 1, a computer system 10A is a WWW client that requests WWW resources, that is, information about pages, and is assumed to have activated a WWW browser.

A WWW browser is an application for obtaining resources on WWW servers and reproducing page on screens and, according to URL entered to a location box on a WWW browser window screen (or URL embedded in an anchor in a homepage), searches WWW resource spaces of hyperlink structure dispersed on the network 1 and obtains a specified WWW resource, that is, information about a page to be displayed on a browser screen.

A computer system indicated by a reference numeral 10B in FIG. 1 is a WWW server. The WWW server 10B provides WWW resources possessed by it to WWW clients. This example assumes that the WWW server 10B provides geographical information and train change guidance information to the client.

The WWW server 10B has a page data storage unit 21 for storing page data as resources and a procedure holding unit 22 for holding procedures remotely called and executed through the network 1.

A page data storing unit 21 stores contents, databases, and other resources necessary for creating maps and train change guidance pages. The procedure holding unit 22 holds procedures such as CPAGE22a, a map creation procedure 22b, and a train change guidance creation procedure 22c.

The procedure CPAGE22a is used to create customized pages, based on inputted a user's personal information such as a name and an address (e.g., a starting point and an ending point), in conjunction with the map creation procedure 22b and the train change guidance creation procedure 22c. The map creation procedure 22b creates a map containing a starting point and ending point, both inputted, and the train change guidance creation procedure 22c creates guidance for changing trains to head from a starting point to an ending point, both inputted. A request to call or execute the procedure CPAGE22a is made by specifying URL.

A computer system indicated by a reference numeral 10C in FIG. 1 operates as a personal information management server. The personal information management server 10C has a personal information storage unit 31 for storing personal information, a procedure holding unit 32 for holding procedures remotely called and executed, and a page data storage unit 33 for storing page information.

Procedures executed on the personal information management server 10C include registration 32a, modification 32b, and deletion 32c of users' personal information, and the fetching 32d of personal information from the personal information storage unit 31. Invocation of the procedures such as registration and fetching of personal information is requested by specifying a URL, and a page corresponding to the specified URL is retrieved from the personal information storage unit 31 and returned to a requesting source. A specified procedure, if a variable is contained in a URL, also performs processing for converting to personal information corresponding to the variable. Management processing of personal information by the personal information management server 10C will be described in detail later.

A computer system indicated by a reference numeral 10D in FIG. 1 is a server run by the provider of WWW pages. To be more specific, the computer system is a server run by a specific group or organization (referred to as ABCD Co., Ltd. in this example) such as companies, and accepts access from general users such as the client 10A, and returns pages customized according to a user's personal information to the client 10A. The server 10D has a page data storage unit 41.

For example, the server 10D provides, as well as the homepage of the company, pages containing a map showing a route to the company location and train change guidance on the homepage to accessing users. The map page and the train change guidance page are created using the above-described resources of the WWW server 10B, that is, by calling the WWW server 10B for the map creation and train change guidance procedures. Herein created are the map page and the train change guidance page customized according to personal information such as a user's address. Details of page customization will be given later.

Next, the procedure for registering personal information will be described.

Figure 2:
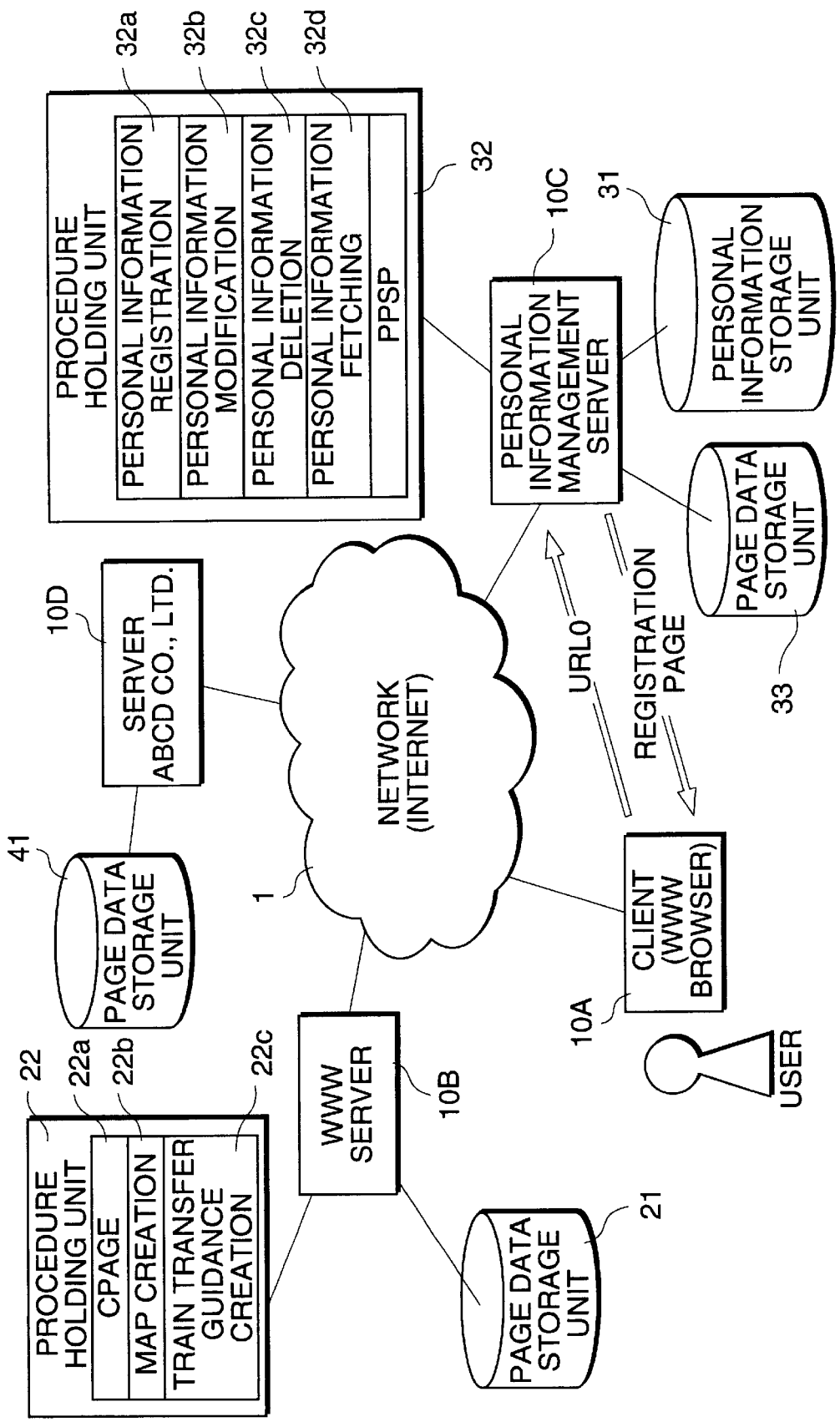
FIG. 2 is a schematic view of how a client 10A registers a user's personal information in a personal information management server 10C, and is more specifically a view of how a registration page is transferred from a personal information management server 10C in response to a request from the client 10A.
Figure 3:
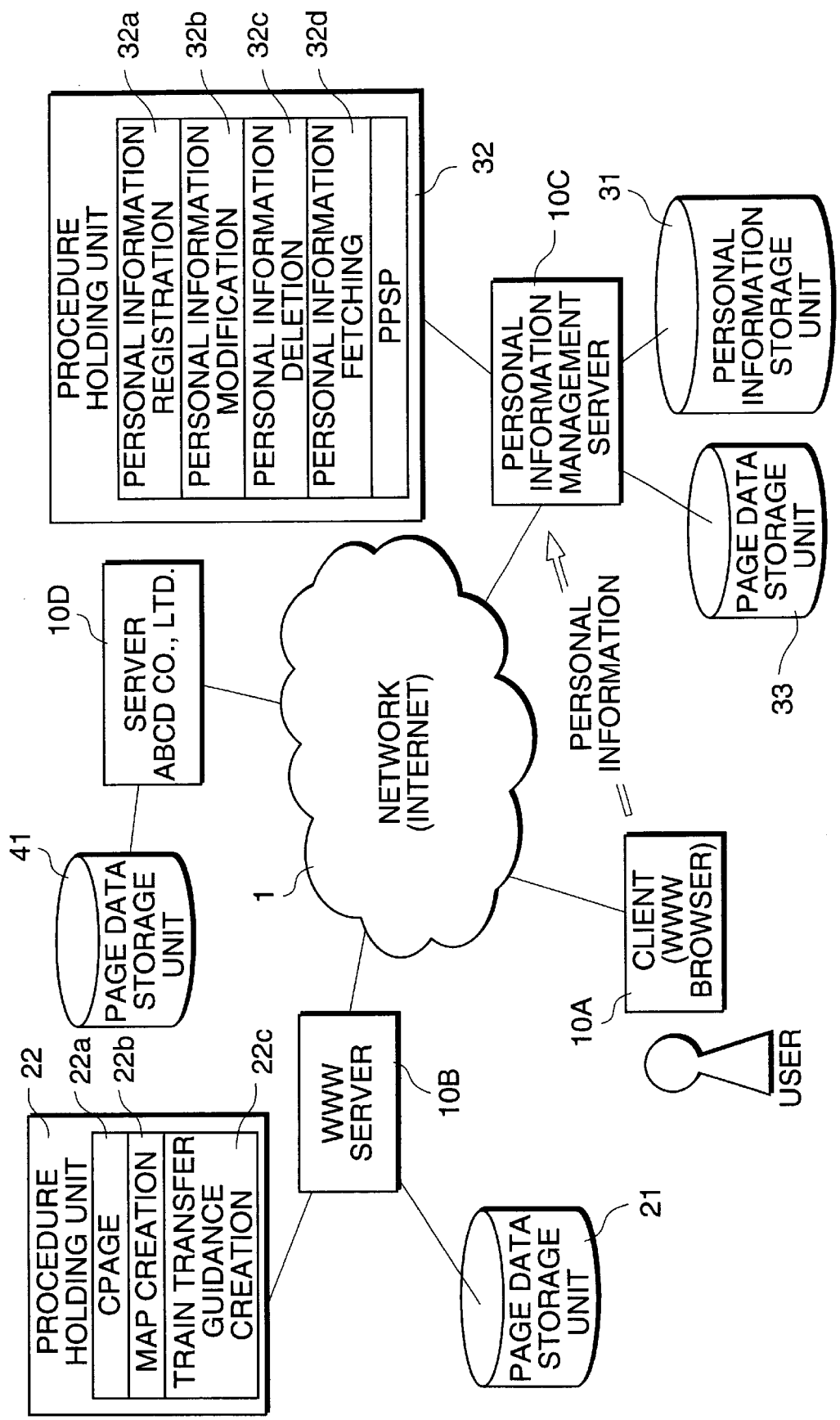
FIG. 3 is a schematic view of how the client 10A registers a user's personal information in the personal information management server 10C, and is more specifically a view of how a registration page to which personal information has been inputted on a WWW browser screen is returned to the personal information management server 10C.

FIGS. 2 and 3 are schematic views of how the client 10A registers a user's personal information in the personal information management server 10C. Such registration processing is achieved in a manner that the client 10A remotely calls and executes a personal information registration procedure possessed by the personal information management server 10C. Hereinafter, this process will be described with reference to FIG. 2.

A system administrator of the personal information management server 10C predefines the type, attribute, and the like of users' personal information to be managed in the personal information storage unit 31. This embodiment assumes that one entry is provided per user account and each entry, as shown in FIG. 4, has fields to which four items, a user name, a password, a name, and an address, are written.

In this embodiment, the types (numeric value, character string, etc.) of information are not specified when personal information is defined. However, when a type is specified, the type of information may also be managed to check the type when information is inputted.

First, a user or the client 10A requests the personal information management server 10C to newly register his personal information. This request is made by inputting a registration page URL (referred to as "URL0") on a WWW browser screen.

The WWW browser requests a page corresponding to URL0 from the personal information management server 10C. The registration page is fetched from the page data storage unit 33 and transferred to the client 10A (see FIG. 2). As a result, the registration page for inputting personal information as shown in FIG. 5 is displayed on the browser screen. As shown in the figure, the registration page has input fields for entering four items, a user name, a password, a name, and an address, and two buttons, [REGISTER] and [CANCEL].

The user enters the input fields by using a user interface (not shown) such as a keyboard and a mouse. An entry example is shown in FIG. 6. When input contents are erroneous, the user clicks on the CANCEL button by the mouse to make reentry.

After confirming the input contents, the user requests the personal information management unit 10C to register the personal information by clicking on the [REGISTER] button. As a result, a personal information entry as shown in FIG. 7 is transferred from the WWW browser to the personal information management unit 10C.

Registration to the personal information storage unit 31 is executed by calling a personal information registration procedure 32a of the procedure holding unit 32.

Modifications and deletion on personal information entries already registered are performed in the same procedure as the above-described registration processing. Procedures called are personal information modification 32b and personal information deletion 32c. Preferably, the personal information management unit 10C verifies password before admitting modifications and deletion of personal information.

Next, a description will be made of a procedure for supplying pages customized based on registered personal information to the user.

Figure 8:
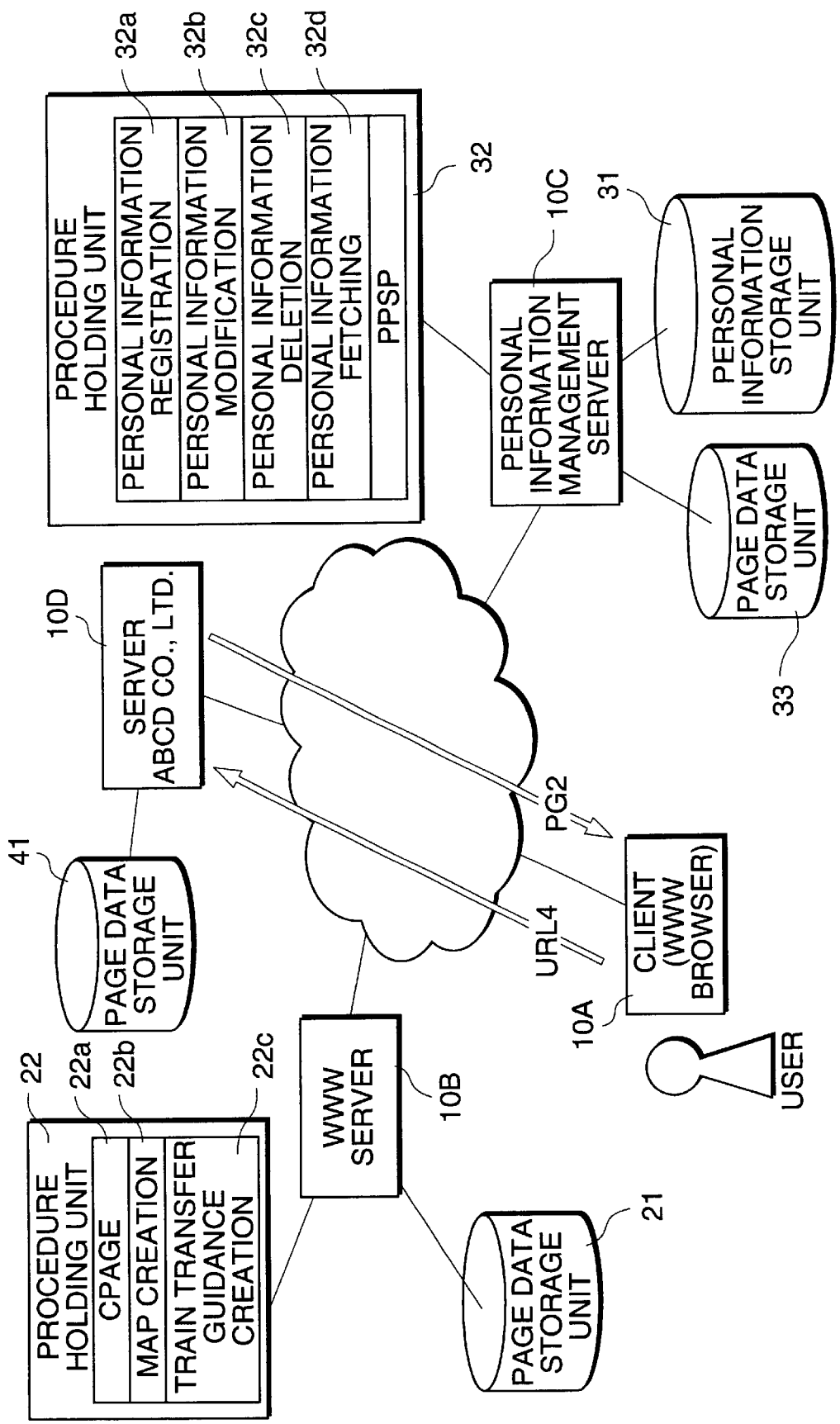
FIG. 8 illustrates in diagrammatic form the behavior of a transaction when the client 10A accesses a server 10D run by ABCD Co., Ltd.

FIG. 8 is a schematic view of the behavior of a transaction when the client 10A accesses the server 10D run by ABCD Co., Ltd.

The user inputs URL (hereinafter referred to as "URL4") indicating resources of the server 10D to the location box of the WWW browser, or clicks on a hot spot in which a link destination URL4 on the browser screen is embedded.

In response to the URL input, the WWW browser requests the server 10D to transfer corresponding page data (hereinafter referred to as "PG2"). PG2 is, e.g., the homepage on company guidance of ABCD Co., Ltd. and is a browser screen as shown in FIG. 9.

A link destination of the anchor of "LINK TO COMPANY GUIDANCE" is a page customized by use of a user's personal information. The provider of PG2 creates URL or URL1 to be associated with the anchor in a procedure described below.

The provider of PG2 creates URL (hereinafter referred to as "URL1") indicating a template of customized page PG1. The URL1 is, for example, written as shown in [Expression 1].

/W1A/CPAGE?name=$NAME&address1=$ADDRESS&address2=
AKASAKA               [Expression 1]

W1A is the host name of the WWW server 10B. The WWW server 10B is a server that actually creates geographical information and train change guidance information (described above). CPAGE is a procedure called to create pages of customized geographical information and train change guidance information (described above).

The character strings name, address1, and address2 after the question mark "?" in the URL character string are parameters passed to the procedure CPAGE (described above). In this embodiment, address1 designates the address of the user and address2 designates the address of ABCD Co., Ltd. (referred to as "AKASAKA"). address1 and address2 provide starting point and ending point information used during map creation or during train change guidance creation.

$NAME is a variable representing personal information corresponding to the name of the user, and $ADDRESS is a variable representing personal information corresponding to the address of the user. To create user-customized pages requires that the variables $NAME and $ADDRESS be replaced by personal information of the requesting user by accessing a personal information database managed by the personal information management server 10C.

Accordingly, the provider of PG2 creates URL referred to as "URL2") as shown by [Expression 2] in order to send URL1 to the personal information management server 10C and replace the variables by personal information.

/PPS1A/PPSP?CURL=/W1A/CPAGE?name=$NAME&address1= $ADDRESS&address2=A KASAKA            [Expression 2]

Of character strings constituting URL2, PPS1A is the host name of the personal information management server 10C. PPSP is a procedure for replacing a variable contained in a specified argument by personal information and is one of the procedures stored in the procedure holding unit 32 of the personal information management server 10C (see FIG. 1) CURL designates an argument passed to the procedure PPSP. In [Expression 2], URL1 is specified as CURL.

Next, the provider of PG2 describes the created URL2 as a link destination in the page PG2. The link destination URL2 is embedded in a hot spot "LINK TO COMPANY GUIDANCE" on the browser screen. A source code of the page PG2 is shown in FIG. 10.

In the examples shown in [Expression 2] and FIG. 10, for convenience of description, URL1 is described so that it is contained in URL2 in the normal format of URL character strings. In actual implementation, URL1 is described contained in URL2 in a URL encode format. URL2 actually used in shown in [Expression 3].

/PPS1A/PPS?CURL= http%3A%2F%2FW1A%2FCPAGE%3Fname%3D%A1 %FONAME%26address1%3D%A1%FOADDRESS %26address2%3D%CO%D6%BA%E4            [Expression 3]

On the other hand, the user follows links on the WWW browser screen about PG2 (see FIG. 9). Assume that the user clicks on the hot spot "LINK TO COMPANY GUIDANCE" in which the link destination URL2 is embedded.

Figure 11:
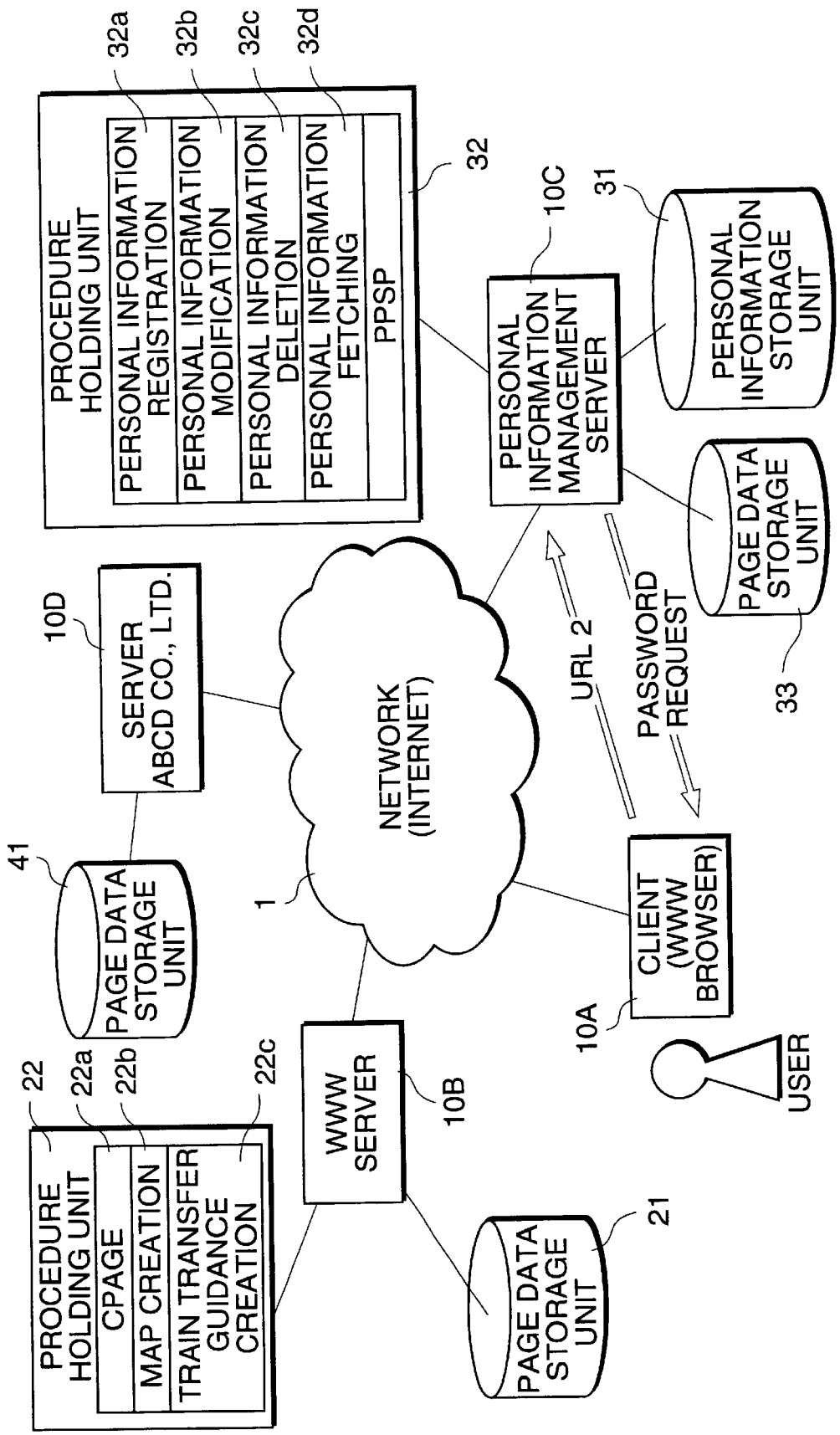
FIG. 11 is a schematic view of a transaction executed in response to clicking on "LINK TO COMPANY GUIDANCE"

FIG. 11 schematically illustrates the behavior of a transaction executed in response to clicking on "LINK TO COMPANY GUIDANCE".

The WWW browser operating on the client 10A opens the linked URL2. As a result, a request for a page is made from the WWW browser to the personal information management server 10C.

In response to the page request, the personal information management server 10C requests a user name and a password from the client 10A as a user authentication procedure. For this reason, a dialog box as shown in FIG. 12 is displayed on the WWW browser screen. Although, in this embodiment, a system is adopted which authenticates users by verifying passwords, the spirit and scope of the present invention are not limited to this. Other authentication systems, e.g., a system employing public key cryptosystem, may also be used. (The public key cryptosystem has two encryption keys having the nature that if encryption is made by one key, decryption can be made only by another key. Usually, an owner of encryption keys uses one key as a public key provided to a third party and uses another key as a private key secretly managed by the owner. A sender can, by encrypting data by a public key of a receiver, safely send the data in the state of cipher mail that can be decoded only by the receiver. Another use of the public key cryptosystem is user authentication by so-called digital signature. An owner of a public key encrypts data by his private key. Since a receiver of the encrypted data can restore the encrypted data with the public key of the sender, the receiver can authenticate the received data from the sender.) The user enters a user name "hashimoto" and a password "hogehoge" on the dialog box and clicks on the [OK] button. In response to this operation, the entered user name and password are transferred to the personal information management server 10C.

In response to the password transfer, the personal information management server 10C searches a personal information table stored in the personal information storage unit 31 for a relevant personal information entry.

If no relevant personal information entry is found, the personal information management sever 10C returns the fact to the client 10A or the WWW browser.

On the other hand, if a relevant personal information entry is found, the personal information entry is obtained and the procedure PPSP is executed with the value of the argument CURL as URL1.

The called procedure PPSP, upon input of URL1, analyzes variables contained in URL1. Next, the procedure PPSP refers to obtained personal information (see FIG. 7), gets the name and address of the requesting user, and replaces the variables "name" and "address1" by them. As a result, URL (hereinafter referred to as "URL3") as shown in [Expression 4] is created.

/W1A/CPAGE?name=HASHIMOTO&address1= HADANO&address2=AKASAKA            [Expression 4]

The procedure PPSP creates a reply page (hereinafter referred to as "PG3") containing the URL3 and returns it to the WWW browser or client 10A. A source code of the PG3 is shown in FIG. 13.

Figure 14:
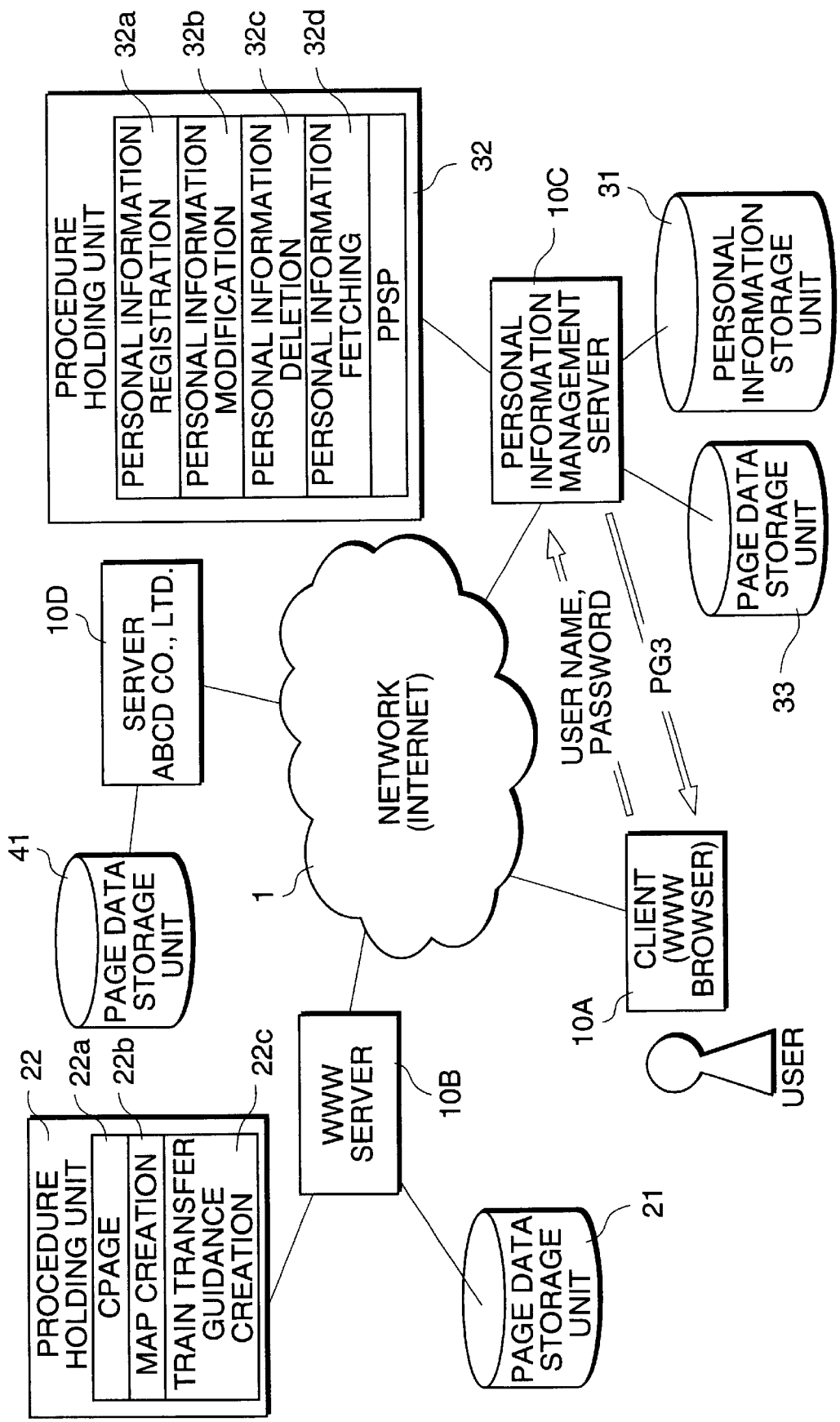
FIG. 14 is a schematic view of the behavior of a transaction for user authentication during transfer of personal information.

An example shown in FIG. 13 uses JavaScript™ (a trademark of the U.S. Sun Microsystems, Inc.) so that URL3 contained in the reply page PG3 is automatically opened by the WWW browser. In the source codes are contained codes to display a dialog box for authenticating the user before opening URL3. A user authentication operation performed between the WWW browser and the personal information server 10C is schematically shown in FIG. 14.

The WWW browser or client 10A, upon receipt of the page PG3 shown in FIG. 13, displays the dialog box as shown in FIG. 15 to prompt the user for confirmation. If the [Cancel] button is clicked on the dialog box, processing is forcibly terminated and the personal information is not transferred.

On the other hand, if the [OK] button is clicked, JavaScript (see FIG. 13) described in the page PG3 is executed and URL3 is opened. Since the host name of the WWW server 10B is specified in URL3, the request is transferred to the WWW server 10B.

Figure 16:
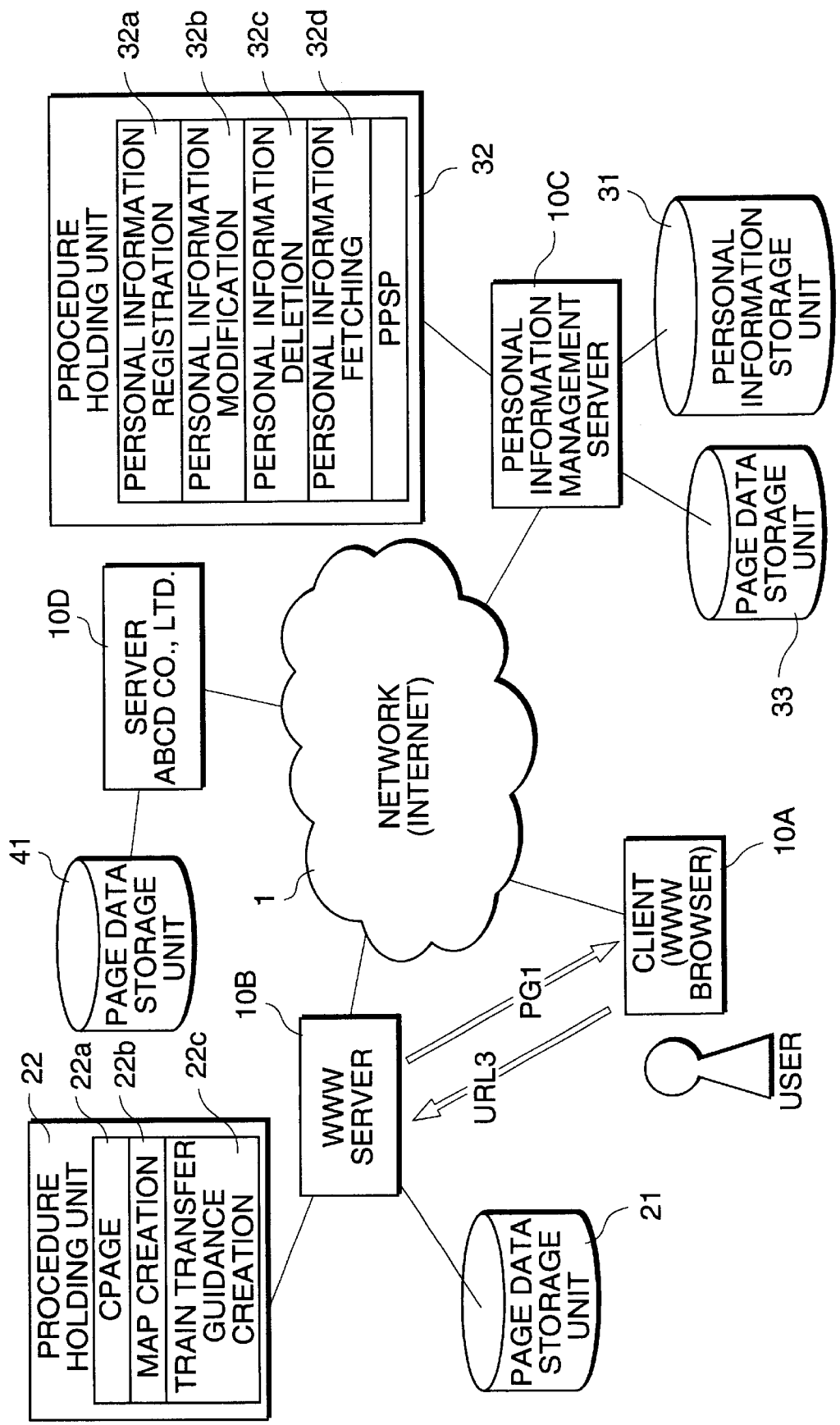
FIG. 16 is a schematic view of the behavior of a transaction performed between the WWW browser and the WWW server 10B.

FIG. 16 is a schematic view of the behavior of a transaction performed between the WWW browser or the client 10A and the WWW server 10B.

The WWW server 10B, upon receipt of the request, executes the procedure CPAGE 22a (described previously) with the value of the parameter name as "HASHIMOTO", the value of address1 as "HADANO", and the value of address2 as "AKASAKA".

The procedure CPAGE 22a calls the map creation procedure 22b and passes the value of address1 and the value of address2. The map creation procedure 22b creates a map (hereinafter referred to as "MAP1") containing the address "HADANO" of the requesting user and the address "AKASAKA" of ABCD Co., Ltd. It is to be understood that MAP1 is a map customized according to the user's personal information.

The procedure CPAGE 22a calls the train change guidance creation procedure 22c and passes the value of address1 and the value of address2. The train change guidance creation procedure 22c creates a train change guidance (referred to as "NO1") from the address "HADANO" of the requesting user to the address "AKASAKA" of ABCD Co., Ltd. It is to be understood that NO1 is a train change guidance customized according to the user's personal information.

The procedure CPAGE 22a receives MAP1 and NO1 as return values from the procedures 22b and 22c and creates a company guidance page (hereinafter referred to as "PG1") customized according to the personal information of the requesting user. The page PG1 is transferred to the WWW browser or the client 10A and is displayed on the WWW browser screen.

FIG. 17 shows an example of a customized company guidance page. The user is automatically provided with a company guidance page customized according to his personal information simply by performing a link opening operation on the hot spot "LINK TO COMPANY GUIDANCE" provided on the homepage of ABCD Co., Ltd.

The server 10D to provide pages customized according to personal information needs only to design a URL with a user's personal information as variables.

As has been described above, the present invention can provide an excellent personal information management apparatus and a customizing apparatus that can suitably manage users' personal information and customize processing according to the personal information.

The present invention can provide an excellent personal information management apparatus and a customizing apparatus that can suitably manage personal information of each client user in a distributed network system having one or more severs and one or more clients and customize a server's processing according to the personal information.

The present invention can provide an excellent personal information management apparatus and a customizing apparatus that enable servers to transfer resources customized according to a user's personal information in response to a resource service request from a client user.

The present invention can provide an excellent personal information management apparatus and a customizing apparatus that enable a browser of WWW clients to suitably display pages customized according to a user's personal information in WWW resource spaces having WWW (World Wide Web) servers and WWW clients.

What is claimed is:

1. A personal information management apparatus for managing personal information, comprising:
   a personal information storage unit that stores personal information; and
   a personal information management unit that performs registration, modification and deletion of personal information entries for the personal information storage unit, the personal information management unit comprising:
      first means for accepting a personal information fetching request containing a character string of a predetermined format;
      second means for fetching a requested personal information entry from the personal information storage unit;
      third means for analyzing a received character string to specify a partial character string to be replaced with the fetched personal information; and
      fourth means for replying to the request by replacing the partial character string with the personal information.

2. The personal information management apparatus according to claim 1, wherein the personal information management unit further comprises fifth means for authenticating a requesting user upon receipt of a request.

3. The personal information management apparatus according to claim 1, wherein the personal information management apparatus is connected to a network and receives requests for personal information via the network.

4. The personal information management apparatus according to claim 1, wherein the personal information management apparatus is connected to a network making requests and replying to requests according to the HTTP (Hyper Text Transfer Protocol) protocol, and receives requests for personal information in URL (Uniform Resource Locator) character string form.

5. A customizing apparatus for customizing resources according to personal information, comprising:
   a personal information management apparatus that performs registration, modification, and deletion of personal information;
   a resource supplying apparatus that supplies stored resources according to a request; and
   a resource requesting apparatus that requests the supply of customized resources, the resource requesting apparatus, when requesting the supply of a resource customized according to personal information, requesting the personal information management apparatus to fetch the personal information and transmitting the obtained personal information to the resource supplying apparatus, wherein a reference to the resource customized according to personal information is described in a character string format containing a variable to be converted to the personal information and the personal information management apparatus receives the reference and converts the variable in the character string to the personal information.

6. The customizing apparatus according to claim 5, wherein the personal information management apparatus, resource supplying apparatus and resource requesting apparatus are connected to a network making requests and replying requests according to the HTTP (Hyper Text Transfer Protocol) protocol, and a resource supplied by the resource supplying apparatus is a hypertext containing references describing link relations with other resources.

7. The customizing apparatus according to claim 6, wherein a reference to a resource is described in URL (Uniform Resource Locator) character string form.

8. The customizing apparatus according to claim 7, wherein a first URL, described in a format that contains an address of a server supplying resources, a procedure for performing customizing and a variable to be converted to personal information necessary for the customizing, is provided in advance, and wherein the resource supplying apparatus presents a second URL, described in a format that contains an address of the personal information management apparatus, the first URL character string and a procedure for converting the variable in the first URL character string to the personal information, to the resource requesting apparatus.

9. The customizing apparatus according to claim 5, wherein the personal information management apparatus, resource supplying apparatus and resource requesting apparatus are connected via a network.

10. The customizing apparatus according to claim 5, wherein the personal information management apparatus performs a predetermined authentication process upon receipt of a personal information fetching request from the resource requesting apparatus.

* * * * *